United States Patent
Au et al.

(10) Patent No.: US 9,664,568 B2
(45) Date of Patent: May 30, 2017

(54) EXTENDED TEMPERATURE MAPPING PROCESS OF A FURNACE ENCLOSURE WITH MULTI-SPECTRAL IMAGE-CAPTURING DEVICE

(71) Applicant: Honeywell International Inc., Morristown, NJ (US)

(72) Inventors: Kwong W. Au, Bloomington, MN (US); Sharath Venkatesha, Minnetonka, MN (US); Stefano Bietto, Tulsa, OK (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 325 days.

(21) Appl. No.: 14/306,047

(22) Filed: Jun. 16, 2014

(65) Prior Publication Data

US 2015/0362371 A1  Dec. 17, 2015

(51) Int. Cl.
*G01J 5/00* (2006.01)
*G01J 5/02* (2006.01)
(Continued)

(52) U.S. Cl.
CPC .............. *G01J 5/0044* (2013.01); *G01J 5/026* (2013.01); *G01J 5/602* (2013.01); *G06T 5/005* (2013.01);
(Continued)

(58) Field of Classification Search
CPC .......... G01J 5/0044; G01J 5/026; G01J 5/602; G01J 2005/0077; G06T 7/408;
(Continued)

(56) References Cited

U.S. PATENT DOCUMENTS

| | | | | |
|---|---|---|---|---|
| 4,750,139 A | * | 6/1988 | Dils | ........................... G01J 5/08 250/227.23 |
| 5,109,277 A | * | 4/1992 | James | ................... G01J 5/0044 348/165 |

(Continued)

FOREIGN PATENT DOCUMENTS

JP    2003344166 A    12/2003

OTHER PUBLICATIONS

Zhao et at, "Research on temperature distribution of combustion flames . . . " Optics & Laser Technology (2007), vol. 39, 1351-1359.
(Continued)

*Primary Examiner* — Sath V Perungavoor
*Assistant Examiner* — Philip Dang

(57) ABSTRACT

A process is provided for mapping temperatures in an enclosure. A spectral band for a multi-spectral image-capturing device is selected. An intensity-temperature mapping is generated by performing an intensity-temperature calibration based on an intensity of an image pixel in a field of view (FOV) generated by the multi-spectral image-capturing device, a corresponding temperature measurement, and a selected device setting of the image-capturing device. An emitted radiation is detected based on a first spectral image in the FOV. At least one region is determined whether it is poor responsive, which is underexposed or overexposed, such that an accurate temperature is unable to be estimated based on a temperature value associated with the spectral band. Temperatures of the at least one poor responsive regions are replaced with temperatures from corresponding acceptable regions from at least one other spectral image to provide an extended temperature mapping of the enclosure.

17 Claims, 3 Drawing Sheets

(51) Int. Cl.
*G01J 5/60* (2006.01)
*G06T 5/00* (2006.01)

(52) U.S. Cl.
CPC ....... *G06T 5/008* (2013.01); *G01J 2005/0077* (2013.01); *G06T 2207/10048* (2013.01)

(58) Field of Classification Search
CPC ......... G06T 7/0024; G06T 2207/10048; G06T 2207/20208
See application file for complete search history.

(56) References Cited

U.S. PATENT DOCUMENTS

| | | | |
|---|---|---|---|
| 5,368,471 A * | 11/1994 | Kychakoff | F23N 5/082 110/186 |
| 5,822,222 A | 10/1998 | Kaplinsky et al. | |
| 6,404,920 B1 * | 6/2002 | Hsu | G06K 9/00201 382/190 |
| 6,690,011 B2 * | 2/2004 | Watanabe | G06K 9/00651 250/330 |
| 7,445,382 B2 * | 11/2008 | Camm | G01J 5/0003 374/121 |
| 7,734,439 B2 * | 6/2010 | Timans | G01J 5/0003 702/99 |
| 7,938,576 B1 * | 5/2011 | Kychakoff | G01J 5/605 374/124 |
| 7,956,326 B1 | 6/2011 | Kychakoff et al. | |
| 8,094,301 B2 | 1/2012 | Saveliev et al. | |
| 8,300,880 B2 | 10/2012 | Esmaili et al. | |
| 8,369,563 B2 | 2/2013 | Zavagli et al. | |
| 8,410,441 B2 * | 4/2013 | Stratmann | H04N 5/232 250/330 |
| 8,543,357 B1 * | 9/2013 | Marandos | G01J 5/0003 250/341.8 |
| 8,748,808 B2 * | 6/2014 | Le Noc | G01J 5/026 250/252.1 |
| 2002/0126732 A1 * | 9/2002 | Shakouri | G01J 5/00 374/130 |
| 2003/0123518 A1 * | 7/2003 | Abbasi | G01J 5/00 374/124 |
| 2009/0326381 A1 * | 12/2009 | Yuan | A61B 5/015 600/473 |
| 2013/0342680 A1 | 12/2013 | Zeng et al. | |
| 2014/0022410 A1 * | 1/2014 | Gish | H04N 1/60 348/223.1 |

OTHER PUBLICATIONS

Luo et al., "A combustion monitoring system with 3-D temperature reconstruction . . . " IEEE Transactions on Instrumentation & Measurement (2007), 56(5), 1877-1882.

Wang et al., "Temperature field reconstruction of combustion flame . . . " Optical Engineering (2013), 52(4), 1-10.

Brisley et al., "Three-dimensional temperature measurement of combustion flames . . . " IEEE Transactions on Instrumentation & Measurement (2005), 54(4), 1417- 1421.

Lu et al., "A digital imaging based multifunctional flame monitoring system," IEEE Transactions on Instrumentation & Measurement (2004), 53(4), 1152-1158.

* cited by examiner

EXTENDED TEMPERATURE MAPPING PROCESS OF A FURNACE ENCLOSURE WITH MULTI-SPECTRAL IMAGE-CAPTURING DEVICE

The present invention relates generally to a process for estimating temperature readings of a furnace enclosure, and more particularly to an intensity to temperature mapping process for estimating a high dynamic temperature range of the furnace enclosure using a multi-spectral image-capturing device.

BACKGROUND OF THE INVENTION

Accurately analyzing internal conditions of a furnace is an essential task for an operator to better control temperatures of different regions in a furnace enclosure for producing products more efficiently and saving energy-related costs. Typically, image-capturing devices, such as color cameras, infrared spectrometers, filtered cameras, and the like, are installed in the furnace enclosure for detecting the temperatures of the furnace enclosure. Intensities of image pixels received from the devices have a direct relationship with the temperatures of viewed surfaces inside the furnace.

Such image-capturing devices provide a wide coverage of the furnace enclosure when compared to measurement techniques used by temperature sensors, such as thermal couples and pyrometers. Calibration is performed to establish the relationship between the temperatures and intensities. However, the furnace enclosure has different regions with large variations in surface and volume temperature. For example, certain regions, known as flame regions, are close to a heat source (e.g., a burner), and thus have higher temperatures and higher image pixel intensities when compared to other regions, known as cold regions (e.g., an exhaust area), where the image pixel intensities are relatively lower.

Typically, the regional temperatures of the furnace enclosure can vary depending on locations of the regions. An exemplary temperature value of the cold regions is approximately 300 degree Celsius (or ° C.) or 570 degree Fahrenheit (or ° F.), and for the flame regions, it is approximately 1500° C. or 2700° F. The flame and cold regions can be imaged in the field of view of the same image-capturing device. A dynamic range of each image-capturing device, which describes the ratio between the maximum and minimum measurable light intensities, depends on sensor characteristics of the image-capturing device, which in turn determines the maximum and minimum sensed temperatures and radiance based on device settings (e.g., shutter speed, aperture and gain).

An image-capturing device with a high dynamic range has a large pixel size (pixel pitch) when compared to a regular camera. The cost of a camera with high dynamic range is also much higher compared to a regular camera. However, even if such image-capturing devices are installed and used in the furnace, captured images may be overexposed in one region and/or underexposed in another region due to large variations in temperature and corresponding radiation. As a result, detailed temperature profiles of the overexposed and/or underexposed regions become undetectable or unmeasurable as excessively bright or dark areas. These regions, herein, are referred to as poor responsive regions. Recovering the detailed temperature profiles of these regions is impossible because a limited number of bits per pixel is insufficient to represent a possible temperature range.

Therefore, there is a need for an improved method of providing detailed temperature profiles of the full furnace region and ensuring that overexposed and underexposed regions of the furnace enclosure do not occur while imaging a combustion process of the furnace.

BRIEF SUMMARY OF THE INVENTION

The present invention is directed to an intensity to temperature mapping process for providing a high dynamic temperature range or profile of the furnace enclosure using a multi-spectral image-capturing device.

An important feature of certain embodiments is that the present process merges multiple temperature images, which are transformed from images of different spectral wavelengths to achieve high dynamic temperature range outputs. Temperature measurement is often a prerequisite for many optimal industrial controls. This is particularly true in an industrial furnace, which is a large enclosure heated by multiple burners. Temperature sensors, such as thermal couples and pyrometers, are used to measure the temperature of the furnace. However, the temperature sensors can measure only certain areas of the furnace where the sensors are installed, and thus the remaining surfaces and volumes cannot be measured without the sensors.

It is an important task for an operator to effectively perform temperature measurements of the entire furnace for maximum product yield, maximum energy efficiency, and minimum flue gas consumed. An image-capturing device generates a light intensity image of a selected region of the furnace. Transformation of the observed image intensity to a temperature reading is needed.

Typically, an exposure bracketing method is used to provide the high dynamic temperature profile where multiple images at different exposure times are captured and combined. Unlike the exposure bracketing method, the present process utilizes the multi-spectral image-capturing device to capture multiple images at different spectral wavelengths. In operation, when an amount of emitted radiation at a specific wavelength saturates the intensity of an image pixel, the amount of emitted radiation of the same source at another wavelength may not saturate the intensity of the image pixel in a corresponding spectral image captured by the multi-spectral image-capturing device. As such, the temperature value of the region corresponding to the pixel location can be estimated using the unsaturated image pixel.

The foregoing and other aspects and features of the present invention will become apparent to those of reasonable skill in the art from the following detailed description, as considered in conjunction with the accompanying drawings.

DETAILED DESCRIPTION OF THE INVENTION

Figure 1:
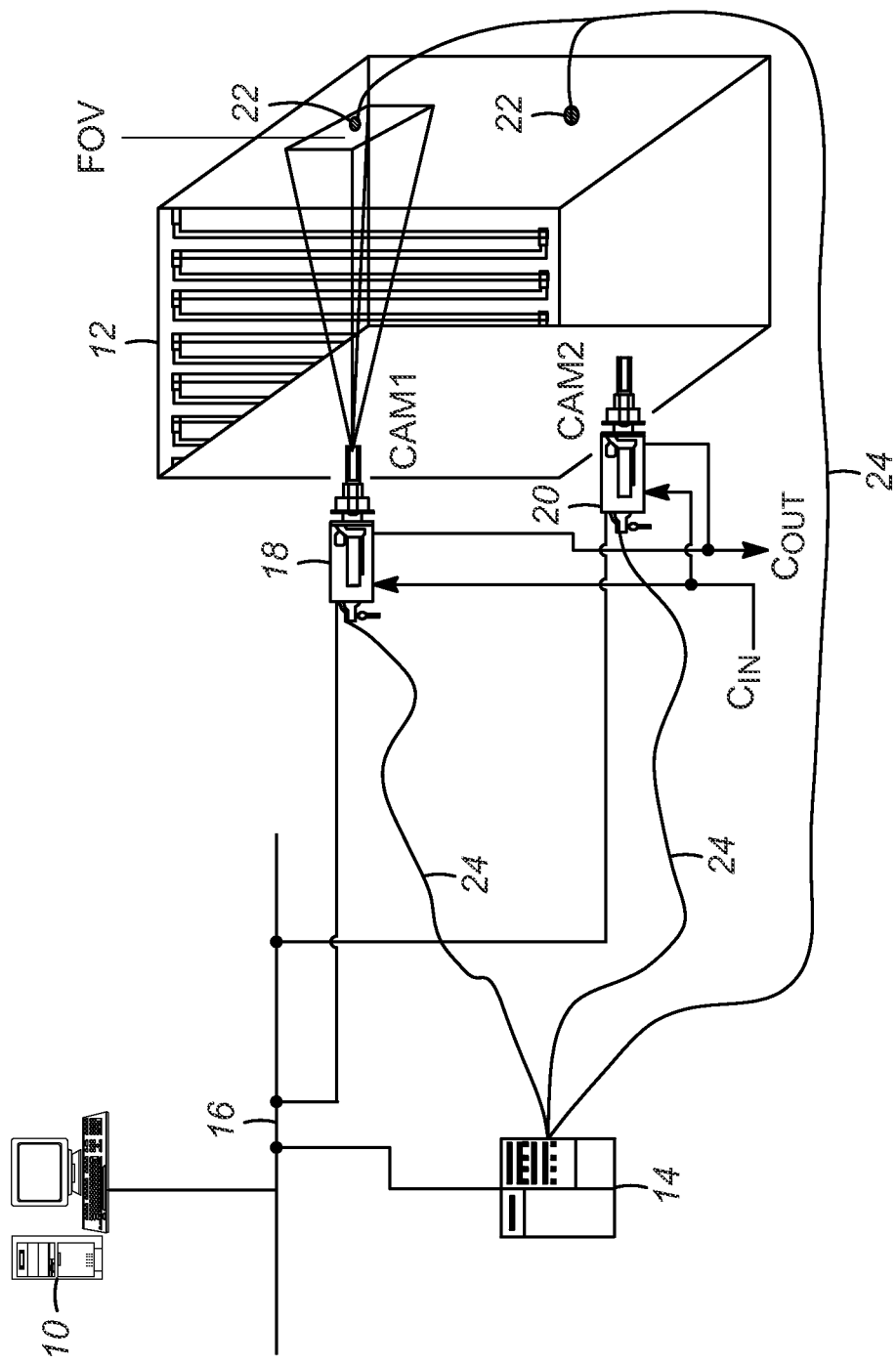
FIG. 1 illustrates an exemplary use of the present process in a camera system configuration.

Referring now to FIG. 1, an exemplary mapping unit 10 using an embodiment of the present process is provided for accurately mapping temperatures of a selected region inside a large scale enclosure 12, such as an industrial furnace. As used herein, the term "unit" may refer to, be part of, or include an Application Specific Integrated Circuit (ASIC), an electronic circuit, a computer processor (shared, dedicated, or group) and/or memory (shared, dedicated, or group) that executes one or more software or firmware programs, a combinational logic circuit, and/or other suitable components that provide the described functionality. Thus, while this disclosure includes particular examples and arrangements of the units, the scope of the present system should not be so limited since other modifications will become apparent to the skilled practitioner.

The mapping unit 10 may reside in or be coupled to a server or computing device 14 (including, e.g., database and video servers), and is programmed to perform tasks and display relevant data for different functional units via a network 16. It is contemplated that other suitable networks can be used, such as a corporate Intranet, a local area network (LAN) or a wide area network (WAN), and the like, using dial-in connections, cable modems, high-speed ISDN lines, and other types of communication methods known in the art. All relevant information can be stored in the databases for retrieval by the mapping unit 10 or the computing device 14 (e.g., as a data storage device and/or a machine readable data storage medium carrying computer programs). Another exemplary mapping unit 10 is disclosed in commonly assigned U.S. patent application Ser. No. 14/306,063, which is incorporated by reference in its entirety.

A plurality of multi-spectral image-capturing devices 18, 20 is mounted around the enclosure 12 (with two devices being shown in this example, but with additional devices being included, if desired). Each of the image-capturing devices 18, 20 captures multi-spectral image sequences covering a selected interior portion or region of the enclosure 12, for which temperature is to be measured. A plurality of temperature sensors 22, such as thermal couples or pyrometers, which are each observable by one or more image-capturing devices 18, 20 is placed inside the enclosure 12. Although only two image-capturing devices 18, 20 and two temperature sensors 22 are shown for illustration purposes, any number of devices and sensors can be used. Alternatively, even a single multi-spectral image-capturing device 18 can be used. Each image-capturing device 18, 20 can be liquid-cooled by directing the inflow of cold coolant $C_{IN}$ to the device, and delivering the outflow of warm coolant $C_{OUT}$ from device to an outlet.

A cable 24 (or other signal transferring means, such as wireless communication) may be used to connect the sensors 22 and the image-capturing devices 18, 20 to the computing device 14, which may also have digitization, storage, and user interface capabilities. The computing device 14 receives temperature outputs or signals from the temperature sensors 22 and image sequences from the image-capturing devices 18, 20 to set proper parameters of the image-capturing devices for performing subsequent intensity-temperature calibration and for estimating the temperature of the selected region of the enclosure 12.

An exemplary calibration and temperature estimation method is disclosed in commonly assigned U.S. patent application Ser. No. 14/296,265, which is incorporated by reference in its entirety. As described in the above '932 application, an intensity of the corresponding image pixel is transformed to the temperature based on device settings of the image-capturing device 18, 20 and the image pixel. Then, this intensity to temperature transformation process performs computation or estimation of the temperatures of image pixels in a field of view (or FOV) of the corresponding image-capturing device 18, 20 by using the intensity-temperature calibration function.

In one embodiment, the temperatures are computed and estimated from a set of intensity images, which are captured by the image-capturing devices 18, 20 that are optimally placed in or in association with the enclosure 12. As shown in FIG. 1, the plurality of image-capturing devices 18, 20 are positioned with respect to the enclosure 12, and the plurality of thermal couples or pyrometers 22 are disposed at selected locations of the enclosure for collecting data. The image-capturing devices 18, 20 are multi-spectral image-capturing devices that capture images at multiple spectral wavelengths based on the furnace applications. A color video camera having has red, green, and blue channels are also contemplated as a multi-spectral camera. A long-wave infrared (LWIR) microbolometer with multiple spectral filters is another example of the multi-spectral image-capturing device.

It is contemplated that the first image-capturing device 18 (CAM1) and the second image-capturing device 20 (CAM2) can be color cameras that capture three different images at red, green and blue wavelengths. As is known in the art, Planck's law states that an amount of radiation emitted by a black body at temperature T is a function of wavelength $\lambda$. Thus, when the amount of emitted radiation at a first predetermined wavelength $\lambda 1$ saturates the intensity of an image pixel, the amount of emitted radiation at a second predetermined wavelength $\lambda 2$ may not saturate the same image pixel in the corresponding spectral image due to a different wavelength setting.

Conversely, if the amount of emitted radiation at the second predetermined wavelength $\lambda 2$ is too low or underexposed in the spectral image, the amount of emitted radiation at the first predetermined wavelength $\lambda 1$ may provide better image intensities at the same pixel in the spectral image. The mapping unit 10 performs a temperature mapping process or method that substitutes or replaces overexposed or underexposed portions of the spectral image for providing an extended temperature mapping of the furnace enclosure 12 using the multi-spectral image-capturing devices 18, 20.

As explained in greater detail below, if the number of bits per pixel in the multi-spectral image devices 18, 20 is equal to 8, the device can measure $2^8$ (or 256) distinct temperature/intensity values (e.g., 0-255). Specifically, when the region is saturated or overexposed, the intensity value is read as 255, and when the region is underexposed, the intensity value is read as zero (0). Thus, the calibrated temperature value of each of the overexposed regions is equal to a maximum value that is detectable by the image-capturing device, and similarly, the calibrated temperature value of each of the underexposed regions is equal to a minimum temperature value that is detectable by the image-capturing device, regardless of the fact that the regions may have different temperature values in reality. More detailed descriptions of certain features of the present mapping process are provided below.

Figure 2:
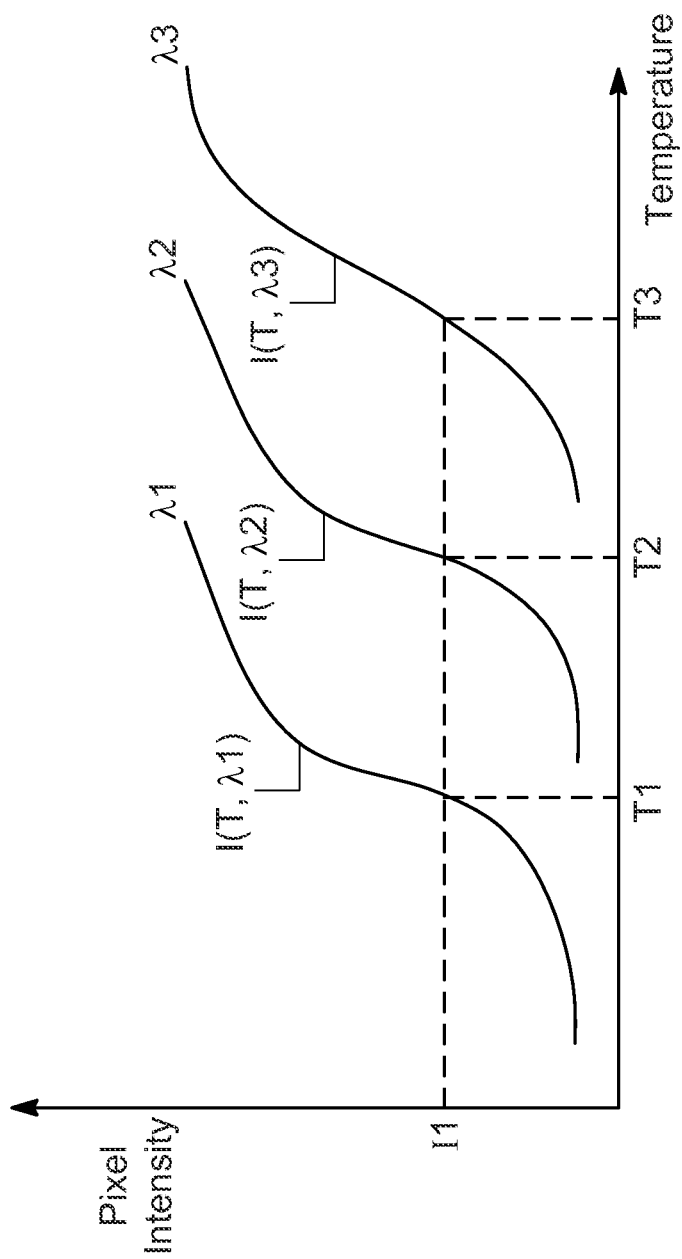
FIG. 2 is a graphical representation of intensity responses as a function of temperature and wavelength in accordance with an embodiment of the present disclosure.
Figure 3:
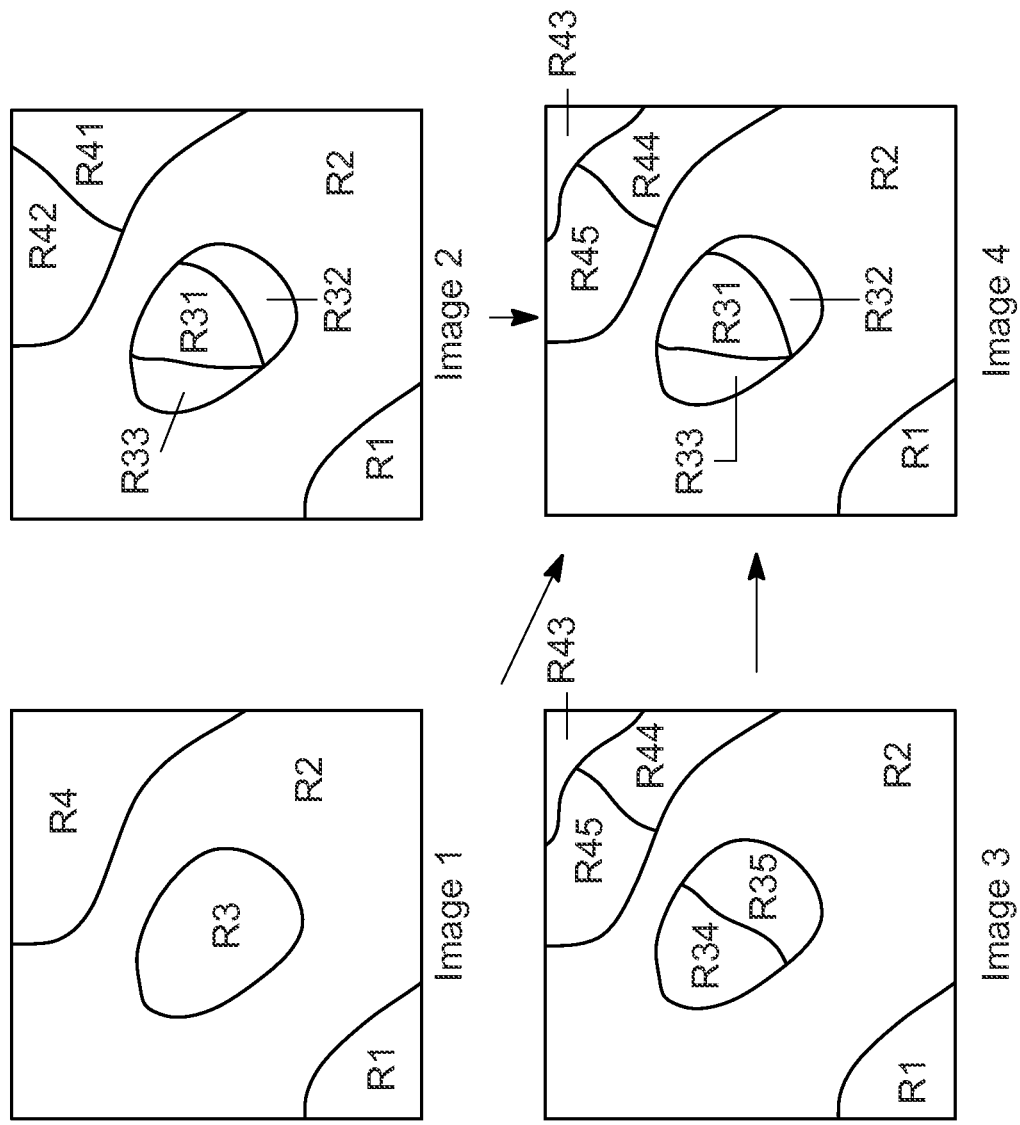
FIG. 3 illustrates an exemplary temperature mapping method in accordance with an embodiment of the present disclosure.

Referring now to FIGS. 2 and 3, an explanation will be provided of how the mapping unit 10, of this embodiment, provides an intensity to temperature mapping method for providing an extended temperature mapping of all regions of the furnace enclosure 12. Typically, the temperature of the combustion process can reach up to 2500 degree Fahrenheit (or ° F.) or 1400 degree Celsius (or ° C.). To cover an entire temperature range (e.g., 0-2500° F. or 0-1400° C.), the device parameters or settings, such as aperture, shutter speed, gain, and wavelength can be selectively set and adjusted. Thus, various intensity-temperature calibration functions can be established based on specific camera settings.

Each spectral band of the image-capturing devices 18, 20 can be calibrated at different wavelengths. As an example, the red channel (R), the green channel (G), and the blue channel (B) of a color video camera can each have their own calibration functions. A single multi-spectral image-capturing device 18 can have an internal or external RGB filter to accommodate three different wavelengths $\lambda 1$, $\lambda 2$, $\lambda 3$, respectively corresponding to the red, green and blue channels of the image-capturing device. Alternatively, three different single-spectral image-capturing devices can be separately dedicated to accommodate three distinct wavelengths $\lambda 1$, $\lambda 2$, $\lambda 3$. Although three wavelengths $\lambda 1$, $\lambda 2$, $\lambda 3$ are shown for illustration purposes, any number of wavelengths is contemplated to suit different applications. Each wave of the wavelengths $\lambda 1$, $\lambda 2$, $\lambda 3$ covers a different span of spectral range (e.g., 0.9 microns to 1.7 microns, 2 microns to 6 microns, or 6 microns to 14 microns), and a distinct corresponding temperature range (e.g., 500-1100° F., 1000-1600° F., or 1500-2500° F.).

FIG. 2 shows a graphical representation of temperature T as a function of image pixel intensity I and wavelength $\lambda$. An important aspect of the graphical representation is that the same pixel intensity I1 can correspond to different temperature values T1, T2, T3 based on a selected wavelength $\lambda 1$, $\lambda 2$, $\lambda 3$. For example, the intensity of 100 units may represent the temperature values of 800, 1200, and 1800° F. (or 430, 650, and 980° C.) in three different spectral images of wavelength $\lambda 1$, $\lambda 2$, $\lambda 3$, respectively. An exemplary pixel intensity I may be defined as provided by expression 1.

$$T = f\{I, \lambda\} \quad (1)$$

As an example only, when the first image-capturing device 18 is set to detect the emitted radiation at the first predetermined wavelength $\lambda 1$, the measurable temperature range may be between 500-1100° F. (or 260-600° C.), wherein the minimum temperature value of 500° F. is read as zero (0), and the maximum temperature value of 1100° F. is read as 255. Thus, certain regions of the furnace enclosure 12 having temperatures lower than 500° F. are underexposed and read as 0, and other regions having temperatures higher than 1100° F. are saturated or overexposed and read as 255. A first graph designated I(T, $\lambda 1$) represents the intensity-temperature relationship associated with the first predetermined wavelength $\lambda 1$.

Similarly, when the same multi-spectral image-capturing device 18 detects the emitted radiation at the second predetermined wavelength $\lambda 2$, the measurable temperature range, for this example, may be between 1000-1600° F. (or 530-900° C.), wherein the minimum temperature value of 1000° F. is read as zero (0), and the maximum temperature value of 1600° F. is read as 255. Thus, certain regions of the furnace enclosure 12 having temperatures lower than 1000° F. are underexposed and read as 0, and other regions having temperatures higher than 1600° F. are saturated or overexposed and read as 255. A second graph designated I(T, $\lambda 2$) represents the intensity-temperature relationship associated with the second predetermined wavelength $\lambda 2$.

Likewise, when the same multi-spectral image-capturing device 18 detects the emitted radiation at the third predetermined wavelength $\lambda 3$, the measurable temperature range, for this example, may be between 1500-2500° F. (or 810-1400° C.), wherein the minimum temperature value of 1500° F. is read as zero (0), and the maximum temperature value of 2500° F. is read as 255. Thus, certain regions of the furnace enclosure 12 having temperatures lower than 1500° F. are underexposed and read as 0, and other regions having temperatures higher than 2500° F. are saturated or overexposed and read as 255. A third graph designated I(T, $\lambda 3$) represents the intensity-temperature relationship associated with the third predetermined wavelength $\lambda 3$.

As a result, by merging or coalescing the three graphs I(T, $\lambda 1$), I(T, $\lambda 2$), I(T, $\lambda 3$) of this example, an extended temperature profile covering the temperature range of 500-2500° F. (or 260-1400° C.) is achieved from the different spectral images of the furnace enclosure 12. Of course, other temperature ranges than those provided for each image-capturing device in this example are also contemplated. Preferably, each temperature range overlaps at least one of the other temperature ranges such as where the upper endpoint of the first range and the lower endpoint of the second range overlap by, for example, 100° F., and the upper endpoint of the second range and the lower endpoint of the third range also overlap by, for example, 100° F. Other overlap amounts beside 100° F. are also contemplated, and it is also contemplated that different overlap amounts could be used between each of the various temperature ranges.

Referring now to FIG. 3, an exemplary temperature mapping method is illustrated that substitutes or replaces overexposed or underexposed portions of the spectral images with portions unaffected by the overexposure or underexposure of the images captured by the image-capturing device 18, 20 for providing an extended temperature mapping of the furnace enclosure 12. A first spectral image IMAGE1 captured by the image-capturing device 18 is partitioned as four different temperature regions R1, R2, R3, R4 by the mapping unit 10 in this example. Each temperature region has a distinct temperature value. For example, the region R1 has the lowest temperature value (e.g., about 600° F.), the region R2 has the second lowest temperature value (e.g., about 800° F.), the region R3 has the second highest temperature value (e.g., about 1200° F.), and the region R4 (e.g., about 1700° F.) has the highest temperature value.

The mapping unit 10 identifies one or more saturated (or alternatively, underexposed) regions in the first spectral image IMAGE1 based on the corresponding temperature values of the regions R1, R2, R3, R4. In this example, IMAGE1 covers the temperature range of 500-1100° F. The saturated (or alternatively, underexposed) regions are substituted or replaced by additional acceptable regions from other spectral images. In this example, the regions R3 and R4 of IMAGE1 are saturated and read as 255 (i.e., greater than or equal to 1100° F.), and thus the mapping unit 10 will retrieve the corresponding regions in other spectral images.

A second spectral image IMAGE2, covering the temperature range of 1000-1600° F., captured by the same image-capturing device 18 is also partitioned as four identical temperature regions R1, R2, R3, R4 as in the first spectral image IMAGE1. However, because the multi-spectral image-capturing device 18 also operates at the second predetermined wavelength $\lambda 2$ and thus is capable of detecting the different temperature range than the first wavelength $\lambda 1$, the regions R3 and R4 are not substantially saturated in the second spectral image IMAGE2. The mapping unit 10 creates sub-regions R31 (e.g., 1210° F.), R32 (e.g., 1220° F.), R33 (e.g., 1230° F.) as the unsaturated region R3, and creates sub-regions R41 (e.g., detected as 1599° F.), R42 (e.g., detected as 1600° F.) as the partially-saturated region R4 in the second spectral image IMAGE2 based on the corresponding temperature values. Then, the mapping unit 10 selects or flags the regions R31, R32, R33, R41, R42 as the additional acceptable regions.

However, because the sub-regions R41 and R42 are partially-saturated (i.e., actual temperature of region R4 may be about 1700° F.), the mapping unit 10 searches for other spectral images for higher temperature resolution. A third spectral image IMAGE3, covering the temperature range of 1500-2500° F., captured by the multi-spectral image-capturing device 18 is also partitioned as four identical temperature regions R1, R2, R3, R4 as in the first and second spectral images IMAGE1, IMAGE2. However, because the image-capturing device 18 operates at the third predetermined wavelength λ3 and thus capable of detecting the different temperature range than the first and second wavelength λ1, λ2, the regions R3 and R4 are not substantially saturated in the third spectral image IMAGE3. Since the detectable temperature range has now shifted into higher temperatures, the regions R1 and R2 in IMAGE3 having substantially lower temperatures than the regions R3 and R4 may be underexposed and read as 0 (i.e., less than or equal to 1500° F.). Accordingly, the regions R1 and R2 in IMAGE3 may be poor responsive regions. The term "acceptable regions" refers to the regions that are neither overexposed nor underexposed, whereas the term "poor responsive regions" refers to the regions that are either overexposed or underexposed.

As for IMAGE3, the mapping unit 10 may create sub-regions R34 (e.g., detected as 1500° F.), R35 (e.g., detected as 1510° F.) as the partially-underexposed region R3, and create sub-regions R43 (e.g., 1700° F.), R44 (e.g., 1710° F.), R45 (e.g., 1720° F.) as the unsaturated region R4. The mapping unit 10 selects or flags the regions R34, R35, R43, R44, R45 as additional acceptable regions in IMAGE3. However, the mapping unit 10 determines that the region R3 in IMAGE2 has higher temperature resolution based on the corresponding temperature values, and thus the sub-regions R34 and R35 in IMAGE3 can be replaced with the sub-regions R31, R32, and R33 in IMAGE2.

During operation, in an attempt to build a temperature image having the best temperature resolution, the mapping unit 10 iteratively searches for other available spectral images with higher resolution captured by the image-capturing devices. The mapping unit 10 selects or flags additional acceptable regions with more detailed temperature sub-regions. For example, the mapping unit 10 constructs a final or fourth spectral image IMAGE4 having regions and sub-regions with best temperature resolutions among the available spectral images. Specifically, the acceptable regions R1 and R2 in IMAGE1, the acceptable sub-regions R31, R32, and R33 in IMAGE2, and the acceptable sub-regions R43, R44, and R45 in IMAGE3 are collected and assembled as the fourth temperature image IMAGE4 by replacing the overexposed and/or underexposed areas of the corresponding spectral images IMAGE1, IMAGE2, and IMAGE3 in a complementary fashion.

The mapping unit 10 applies a suitable intensity-temperature transformation in these unsaturated regions to obtain better temperature resolution in the high temperature range (e.g., temperature value whose intensity reads as 255). As such, the temperature mapping method can be similarly performed for the underexposed regions by the mapping unit 10 to obtain better temperature resolution in the low temperature range (e.g., temperature value whose intensity reads as 0).

For all other acceptable regions, the corresponding temperatures can be estimated based on one of several methods. As a first option, the mapping unit 10 selects and uses a temperature profile of a selected acceptable region that has the largest intensity range among the available spectral images. As a second option, the mapping unit 10 computes the temperature profile as an average value of the temperature profiles in the same acceptable regions of all available spectral images. Merging these acceptable regions with higher temperature resolutions from all available spectral images achieves the extended temperature profile of the furnace enclosure 12. A preferred method is application dependent.

While a particular embodiment of the present mapping process has been described herein, it will be appreciated by those skilled in the art that changes and modifications may be made thereto without departing from the invention in its broader aspects and as set forth in the following claims.

What is claimed is:

1. A process for mapping temperatures in an enclosure during a combustion process, comprising:
   selecting a spectral band for a multi-spectral image-capturing device;
   generating an intensity-temperature mapping by performing an intensity-temperature calibration based on an intensity of an image pixel in a field of view (FOV) generated by the multi-spectral image-capturing device, a corresponding temperature measurement, and a selected device setting of the image-capturing device;
   detecting an emitted radiation based on a first spectral image in the FOV captured by the multi-spectral image-capturing device;
   determining whether at least one region is poor responsive, which is underexposed or overexposed, such that an accurate temperature is unable to be estimated based on a temperature value associated with the spectral band;
   replacing, using a computer processor, temperatures of the at least one poor responsive regions with temperatures from corresponding acceptable regions from at least one other spectral image in order to provide an extended temperature mapping of the enclosure, wherein the extended temperature mapping is of a temperature range wider than that associated with the first spectral image;
   selecting a temperature profile of the acceptable region that has a largest intensity range among the corresponding spectral images;
   computing the temperature profile as an average value of the temperature profiles in the same regions of all available spectral images; and
   merging the acceptable regions with higher temperature resolutions from all available spectral images for achieving the extended temperature mapping of the enclosure.

2. The process according to claim 1, further comprising:
   partitioning the first spectral image captured by the image-capturing device based on the temperature value; and
   identifying poor responsive regions of the first spectral image based on corresponding temperature values of selected regions for replacement.

3. The process according to claim 1, further comprising:
   generating a plurality of spectral images for the same FOV based on different spectral bands; and retrieving corresponding regions of the first spectral image from the at least one other spectral image that shares substantially the same FOV.

4. The process according to claim 3, further comprising:
detecting a different temperature range of the same regions of the first spectral image based on the plurality of spectral images; and
creating sub-regions of the same regions based on corresponding temperature values of selected regions.

5. The process according to claim 1, further comprising:
searching for the at least one other spectral image having regions unaffected by the overexposure or underexposure for higher temperature resolution; and
selecting the acceptable regions unaffected by the overexposure or underexposure from the at least one other spectral image based on corresponding temperature values of selected regions.

6. The process according to claim 1, further comprising:
determining which acceptable region has highest temperature resolutions based on the corresponding temperature ranges; and
replacing the poor responsive regions with regions of highest temperature resolutions for obtaining better temperature resolution in a predetermined temperature range.

7. An apparatus for mapping temperatures in an enclosure, the apparatus comprising:
a mapping unit comprising an Application Specific Integrated Circuit (ASIC), an electronic circuit, a computer processor (shared, dedicated, or group) and/or memory (shared, dedicated, or group) that executes one or more software or firmware programs, or a combinational logic circuit for:
selecting a spectral band for a multi-spectral image-capturing device;
generating an intensity-temperature mapping by performing an intensity-temperature calibration based on an intensity of an image pixel in a field of view (FOV) generated by the multi-spectral image-capturing device, a corresponding temperature measurement, and a selected device setting of the image-capturing device;
detecting an emitted radiation based on a first spectral image in the FOV captured by the multi-spectral image-capturing device;
determining whether at least one region is poor responsive, which is underexposed or overexposed, such that an accurate temperature is unable to be estimated based on a temperature value associated with the spectral band; and
replacing, using a computer processor, temperatures of the at least one poor responsive regions with temperatures from corresponding acceptable regions from at least one other spectral image in order to provide an extended temperature mapping of the enclosure, wherein the extended temperature mapping is of a temperature range wider than that associated with the first spectral image;
wherein the mapping unit comprises an Application Specific Integrated Circuit (ASIC), an electronic circuit, a computer processor (shared, dedicated, or group) and/or memory (shared, dedicated, or group) that executes one or more software or firmware programs, or a combinational logic circuit for:
determining which acceptable region has highest temperature resolutions based on the corresponding temperature ranges; and
replacing the poor responsive regions with regions of highest temperature resolutions for obtaining better temperature resolution in a predetermined temperature range.

8. The apparatus according to claim 7, wherein the mapping unit comprises an Application Specific Integrated Circuit (ASIC), an electronic circuit, a computer processor (shared, dedicated, or group) and/or memory (shared, dedicated, or group) that executes one or more software or firmware programs, or a combinational logical circuit for:
partitioning the first spectral image captured by the image-capturing device based on the temperature value; and
identifying poor responsive regions of the first spectral image based on corresponding temperature values of selected regions for replacement.

9. The apparatus according to claim 8, wherein the mapping unit comprises an Application Specific Integrated Circuit (ASIC), an electronic circuit, a computer processor (shared, dedicated, or group) and/or memory (shared, dedicated, or group) that executes one or more software or firmware programs, or a combinational logic circuit for:
generating a plurality of spectral images for the same FOV based on different spectral bands; and
retrieving corresponding regions of the first spectral image from the at least one other spectral image that shares substantially the same FOV.

10. The apparatus according to claim 9, wherein the mapping unit comprises an Application Specific Integrated Circuit (ASIC), an electronic circuit, a computer processor (shared, dedicated, or group) and/or memory (shared, dedicated, or group) that executes one or more software or firmware programs, or a combinational logic circuit for:
detecting a different temperature range of the same regions of the first spectral image based on the plurality of spectral images; and
creating sub-regions of the same regions based on corresponding temperature values of selected regions.

11. The apparatus according to claim 7, wherein the mapping unit comprises an Application Specific Integrated Circuit (ASIC), an electronic circuit, a computer processor (shared, dedicated, or group) and/or memory (shared, dedicated, or group) that executes one or more software or firmware programs, or a combinational logic circuit for:
searching for the at least one other spectral image having regions unaffected by the overexposure or underexposure for higher temperature resolution; and
selecting the acceptable regions unaffected by the overexposure or underexposure from the at least one other spectral image based on corresponding temperature values of selected regions.

12. The apparatus according to claim 7, wherein the mapping unit comprises an Application Specific Integrated Circuit (ASIC), an electronic circuit, a computer processor (shared, dedicated, or group) and/or memory (shared, dedicated, or group) that executes one or more software or firmware programs, or a combinational logic circuit for:
selecting a temperature profile of the acceptable region that has a largest intensity range among the corresponding spectral images;
computing the temperature profile as an average value of the temperature profiles in the same regions of all available spectral images; and
merging the acceptable regions with higher temperature resolutions from all available spectral images for achieving the extended temperature mapping of the enclosure.

13. A non-transitory computer-readable medium storing instructions executable by a processor to map temperatures in an enclosure during a combustion process, comprising instructions to:
- select a spectral band for a multi-spectral image-capturing device;
- generate an intensity-temperature mapping by performing an intensity-temperature calibration based on an intensity of an image pixel in a field of view (FOV) generated by the multi-spectral image-capturing device, a corresponding temperature measurement, and a selected device setting of the image-capturing device;
- detect an emitted radiation based on a first spectral image in the FOV captured by the multi-spectral image-capturing device;
- determine whether at least one region is poor responsive, which is underexposed or overexposed, such that an accurate temperature is unable to be estimated based on a temperature value associated with the spectral band; and
- replace, using a computer processor, temperatures of the at least one poor responsive regions with temperatures from corresponding acceptable regions from at least one other spectral image in order to provide an extended temperature mapping of the enclosure, wherein the extended temperature mapping is of a temperature range wider than that associated with the first spectral image and;

further comprising instructions to:
- determine which acceptable region has highest temperature resolutions based on the corresponding temperature ranges;
- replace the poor responsive regions with regions of highest temperature resolutions for obtaining better temperature resolution in a predetermined temperature range;
- select a temperature profile of the acceptable region that has a largest intensity range among the corresponding spectral images;
- compute the temperature profile as an average value of the temperature profiles in the same regions of all available spectral images; and
- merge the acceptable regions with higher temperature resolutions from all available spectral images for achieving the extended temperature mapping of the enclosure.

14. The medium according to claim 13, further comprising instructions to:
- partition the first spectral image captured by the image-capturing device based on the temperature value; and
- identify poor responsive regions of the first spectral image based on corresponding temperature values of selected regions for replacement.

15. The medium according to claim 13, further comprising instructions to:
- generate a plurality of spectral images for the same FOV based on different spectral bands; and
- retrieve corresponding regions of the first spectral image from the at least one other spectral image that shares substantially the same FOV.

16. The medium according to claim 13, further comprising instructions to:
- detect a different temperature range of the same regions of the first spectral image based on the plurality of spectral images; and
- create sub-regions of the same regions based on corresponding temperature values of selected regions.

17. The medium according to claim 13, further comprising instructions to:
- search for the at least one other spectral image having regions unaffected by the overexposure or underexposure for higher temperature resolution; and
- select the acceptable regions unaffected by the overexposure or underexposure from the at least one other spectral image based on corresponding temperature values of selected regions.

* * * * *